United States Patent [19]

Takikawa et al.

[11] Patent Number: 5,060,774
[45] Date of Patent: * Oct. 29, 1991

[54] TEMPERATURE-CONTROLLED FAN FLUID COUPLING

[75] Inventors: Kazunori Takikawa; Yuichi Ono, both of Numazu, Japan

[73] Assignee: Usui Kokusai Sangyo Kaisha Ltd., Sunto, Japan

[ * ] Notice: The portion of the term of this patent subsequent to Jan. 10, 2006 has been disclaimed.

[21] Appl. No.: 396,544

[22] Filed: Aug. 21, 1989

[30] Foreign Application Priority Data

Aug. 19, 1988 [JP] Japan .............................. 63-108898[U]
Aug. 19, 1988 [JP] Japan .............................. 63-108899[U]

[51] Int. Cl.$^5$ ........................ F16D 35/00; F16D 43/25
[52] U.S. Cl. .............................. 192/58 A; 192/58 B; 192/82 T
[58] Field of Search ................. 192/58 B, 58 A, 82 T; 123/41.12

[56] References Cited

U.S. PATENT DOCUMENTS

| | | | |
|---|---|---|---|
| 2,879,755 | 3/1959 | Weir | 123/41.12 |
| 2,902,127 | 9/1959 | Hardy | 192/58 A X |
| 2,988,188 | 6/1961 | Tauschek | 192/82 T |
| 3,059,745 | 10/1962 | Tauschek | 192/58 B |
| 3,217,849 | 11/1965 | Weir | 192/82 T |
| 3,259,221 | 7/1966 | Godfrey | 192/58 B |
| 3,272,188 | 9/1966 | Sabat | 123/41.11 |
| 3,430,743 | 3/1969 | Fujita et al. | 192/58 B |
| 3,463,282 | 8/1969 | Fujita et al. | 192/58 B |
| 3,648,811 | 3/1972 | LaFlame | 192/58 B |
| 3,727,735 | 4/1973 | LaFlame | 192/58 B |
| 3,741,359 | 6/1973 | Leichliter | 192/58 A X |
| 3,840,101 | 10/1974 | Peter et al. | 192/58 B |
| 3,856,122 | 12/1974 | Leichliter | 192/58 B |
| 3,964,582 | 6/1976 | Mitchell | 192/58 B |
| 4,004,668 | 1/1977 | Blair | 192/58 B |
| 4,007,819 | 2/1977 | Maci | 192/58 B |
| 4,238,015 | 12/1980 | Schmida | 192/82 T X |
| 4,238,016 | 12/1980 | Yoshida et al. | 192/58 B |
| 4,281,750 | 8/1981 | Clancey | 192/58 B |
| 4,403,684 | 9/1983 | Haeck | 192/58 B |
| 4,437,554 | 3/1984 | Haeck | 192/82 T X |
| 4,505,367 | 3/1985 | Martin | 192/58 B |
| 4,629,046 | 12/1986 | Martin | 192/58 B |
| 4,665,694 | 5/1987 | Brunken | 60/330 |
| 4,667,791 | 5/1987 | Martin et al. | 192/58 B |
| 4,667,792 | 5/1987 | Hauser | 192/82 T X |
| 4,685,549 | 8/1987 | Brunken et al. | 192/58 B |
| 4,699,258 | 10/1987 | Johnston et al. | 192/58 B |
| 4,796,571 | 1/1989 | Ono et al. | 123/41.12 |
| 4,846,331 | 7/1989 | Ono | 192/58 B |
| 4,850,465 | 7/1989 | Ono | 192/82 T X |

FOREIGN PATENT DOCUMENTS

| | | | |
|---|---|---|---|
| 0279271 | 8/1988 | European Pat. Off. | 192/58 B |
| 3719279 | 3/1988 | Fed. Rep. of Germany | 192/58 B |
| 55-76226 | 6/1980 | Japan . | |
| 57-167533 | 10/1982 | Japan . | |
| 57-179431 | 11/1982 | Japan . | |
| 62-124330 | 6/1987 | Japan . | |

Primary Examiner—Rodney H. Bonck
Attorney, Agent, or Firm—Anthony J. Casella; Gerald E. Hespos

[57] ABSTRACT

There is disclosed a temperature-controlled fan fluid coupling which supplies cooling air to the engine of an automobile according to the operating conditions at all times. The coupling includes a rotating shaft, a driving disk fixed to the shaft, and an enclosed housing consisting of a cover and a casing. The coupling further includes a dam for collecting oil, a circulation passage, a valve member for opening and closing a hole formed in a partition plate, and a temperature-sensing element. Radially protruding fins or recessed walls are formed to force oil to the dam.

15 Claims, 13 Drawing Sheets

PRIOR ART

Fig. 14

TEMPERATURE-CONTROLLED FAN FLUID COUPLING

BACKGROUND OF THE INVENTION

1. Field of the Invention

The present invention relates generally to improvements in a temperature-controlled fan fluid coupling which controls the rotation of a fan that cools an automotive engine by supplying an appropriate amount of cooling airflow to the engine always according to the operating conditions.

2. Description of the Prior Art

Figure 13:
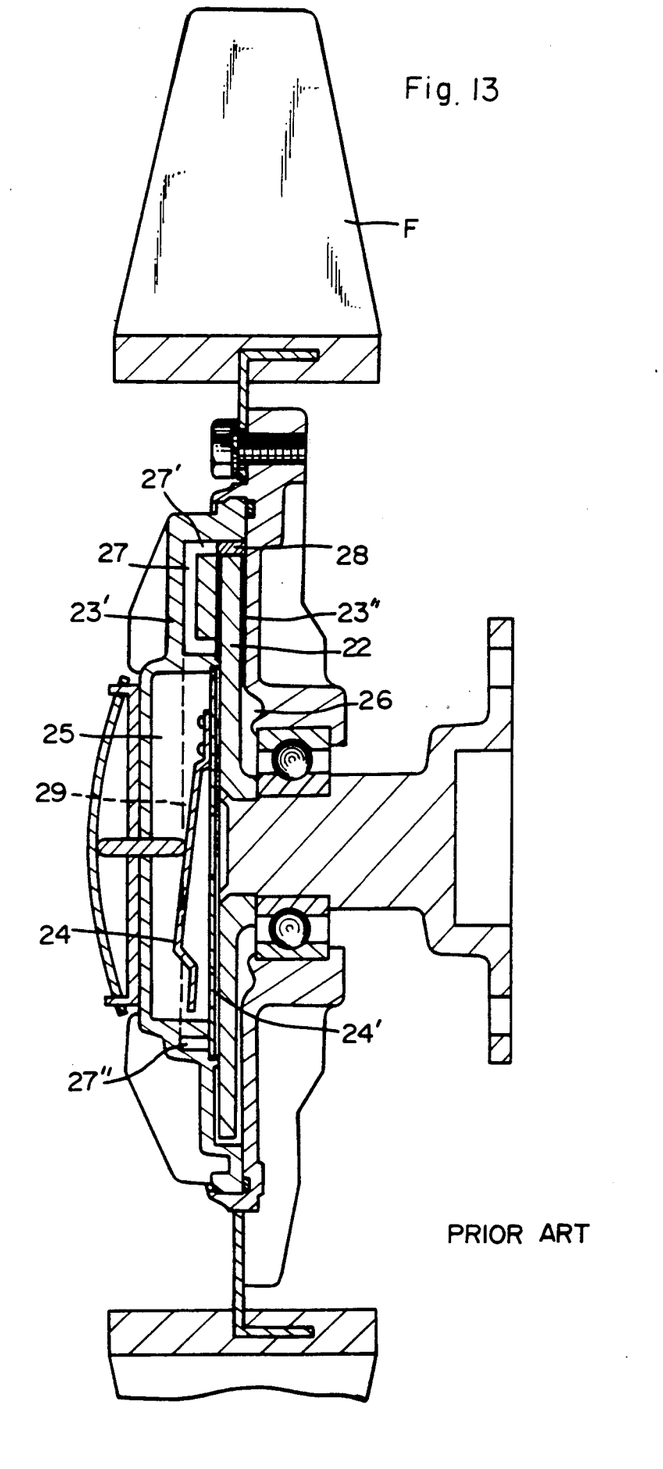
FIG. 13 is a vertical cross section of the prior art temperature-controlled fan fluid coupling.

A conventional fan fluid coupling of this kind is shown in FIG. 13, where an enclosed housing is comprised of a cover 23' and a casing 23''. The inside of the housing is partitioned into an oil reservoir chamber 25 and a torque transmission chamber 26 by a partition plate 24 provided with an outflow control hole 24'. A driving disk 22 is mounted inside the torque transmission chamber 26, which is in communication with the oil reservoir chamber 25 via a dam 28 acting as a pumping portion. A circulation passage 27 extends from the dam 28 and has an entrance port 27' and an exit port 27''. In order that at least one of these ports be located above the level of the oil in the oil reservoir chamber 25 irrespective of the stopped condition, the exit port 27'' is formed at the open end of a substantially arc-shaped groove 29 communicating with the circulation passage 27. The groove 29 is formed by holding a partition wall around the inner wall surface of the oil reservoir chamber 25.

In this prior art fan fluid coupling, if the circulation passage 27 is submerged in the oil inside the oil reservoir chamber 25 when the vehicle is at rest, oil is prevented from spontaneously flowing back into the torque transmission chamber 26 from the reservoir chamber 25 through the passage 27 to prevent collection of oil inside the transmission chamber 26. In this way, the rotational speed of the fan is kept from increasing violently immediately after the engine is started. Therefore, abnormal fan noise is prevented. Also, during cold weather the engine is effectively warmed up. When the engine is operating at high temperatures, the outflow control hole 24' in the partition plate 24 is opened by a valve member, and this hole 24' is submerged in the oil stored in the oil reservoir chamber 25. Under this condition, if the engine is stopped, then oil spontaneously flows out of the chamber 25 through the outflow control hole 24' and a large amount of oil is collected in the torque transmission chamber 26 while the engine is at rest. Accordingly, if the engine is then restarted, the rotational speed of the driven fan increases after the lapse of a certain time as indicated by the performance characteristic curve B in FIG. 14.

In the aforementioned prior art fan fluid coupling, only the centrifugal force produced by rotation forces oil out of the torque transmission gap of the torque transmission chamber and so oil flows slowly through this gap. Heat is produced by shear for a long time, thus elevating the temperature of the oil. Also, the oil is not quickly circulated through the coupling. Since a sufficient amount of heat is not conducted to the outside, the viscosity of the oil changes, or drops. As a result, the fluid coupling fails to act adequately in response to the ambient temperature. Further, hunting takes place possibly because oil does not smoothly flows into the circulation passage due to oil pressure variations around the dam. In addition, the aforementioned increase in the rotational speed of the driven fan occurs for some time.

SUMMARY OF THE INVENTION

In view of the foregoing problems with the prior art techniques, the present invention has been made. It is an object of the invention to provide a fan fluid coupling free of the foregoing problems. In particular, during rotation, supply of oil from the torque transmission gap to the dam is accelerated by the guiding action performed by an oil supply means, or fins or grooved walls, as well as by the centrifugal force acting on the oil itself. This enhances the functions of the dam. Generation of heat due to shear for transmission of torque is suppressed greatly and, therefore, the temperature of oil increases to a lesser extent. Oil is quickly circulated through the whole internal structure, resulting in good heat dissipation. Hence, the viscosity of the oil is less likely to change, or drop. Also, hunting is prevented. In this way, the fan coupling is capable of controlling the transmitted power more appropriately in response to the changing ambient temperature.

The above object is achieved by a fan fluid coupling comprising: an enclosed housing consisting of a cover and a casing; a rotating shaft having a driving disk rigidly fixed at the front end of the shaft; a bearing via which the housing is held to the rotating shaft; a partition plate that is provided with an oil outflow control hole and divides the inside of the housing into an oil reservoir chamber and a torque transmission chamber in which the driving disk is mounted; a dam formed on a part of the inner wall of the housing and opposite to the outer wall of the driving disk on which oil is collected during rotation; a circulation passage connected with the dam and extending from the torque transmission chamber to the oil reservoir chamber; a temperature-sensing element which is installed on the front surface of the cover and deforms as temperature varies; and a valve member which interlocks with the temperature-sensing element and which, when the ambient temperature exceeds a predetermined temperature, opens the outflow control hole in the partition plate and which, when the ambient temperature is below the predetermined temperature, closes the outflow control hole. The effective area with which oil makes contact with the driving disk at a torque transmission gap formed between opposite outer walls of the casing and the cover is increased and decreased to control the torque transmitted from the rotating shaft to the driven enclosed housing. This fan fluid coupling is characterized in that an oil supply means is formed in at least one of the opposite surfaces of the housing and the driving disk at the entrance side of the circulation passage to force oil to the dam. During rotation, the guiding and pumping actions of the oil supply means is combined with the centrifugal force to urge oil from the torque transmission gap to the dam. Especially, the pressure of oil collected in the dam is increased certainly to thereby prevent hunting. Also, flow through the gap is promoted to stabilize the control over the torque transmission. This permits oil to pass through the torque transmission gap in a shorter time. In this way, the time for which heat is produced due to shear caused by torque transmission is shortened. This suppresses increase in oil temperature. The circulation of the oil through the whole internal structure is made rapid and smooth. The result is that heat is dissipated well. Therefore, the viscosity of oil is prevented from dropping. This prevents reduction in the rotational speed of the fan. Hence, it is unlikely that the engine is cooled insufficiently. Thus, the novel fan fluid coupling controls the rotation of the fan more adequately in response to the varying ambient temperature for a long time.

DETAILED DESCRIPTION OF THE PREFERRED EMBODIMENTS

Figure 1:
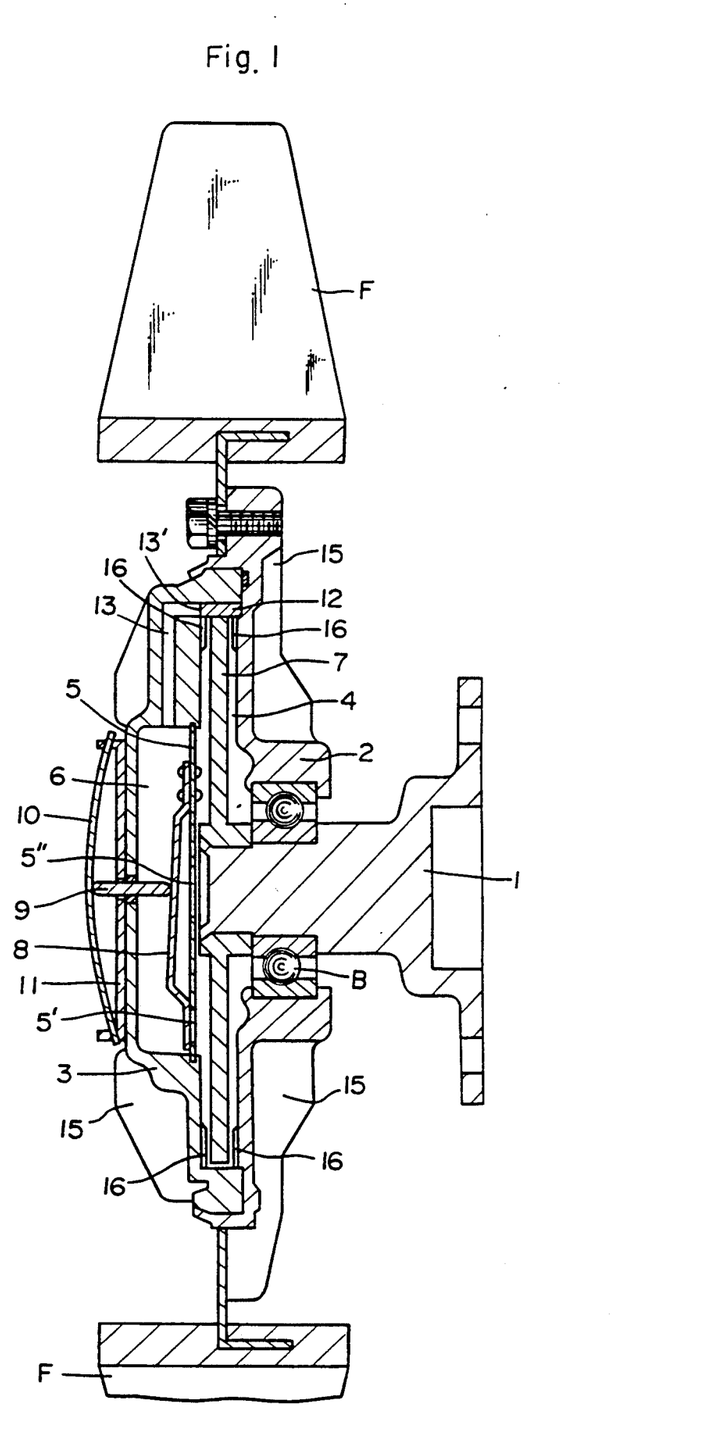
FIG. 1 is a vertical cross section of a temperature-controlled fan fluid coupling according to the invention.
Figure 1A:
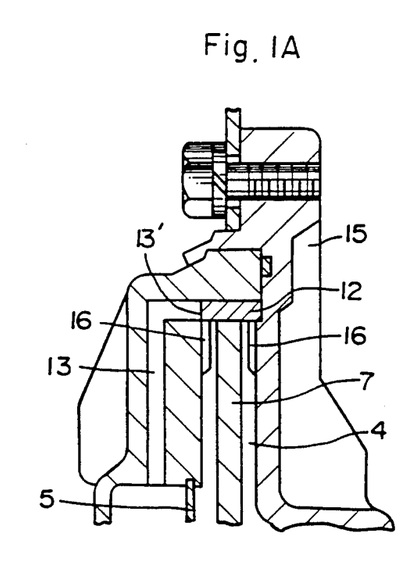
FIG. 1A is an enlarged cross section of main portions of the coupling shown in FIG. 1.
Figure 2:
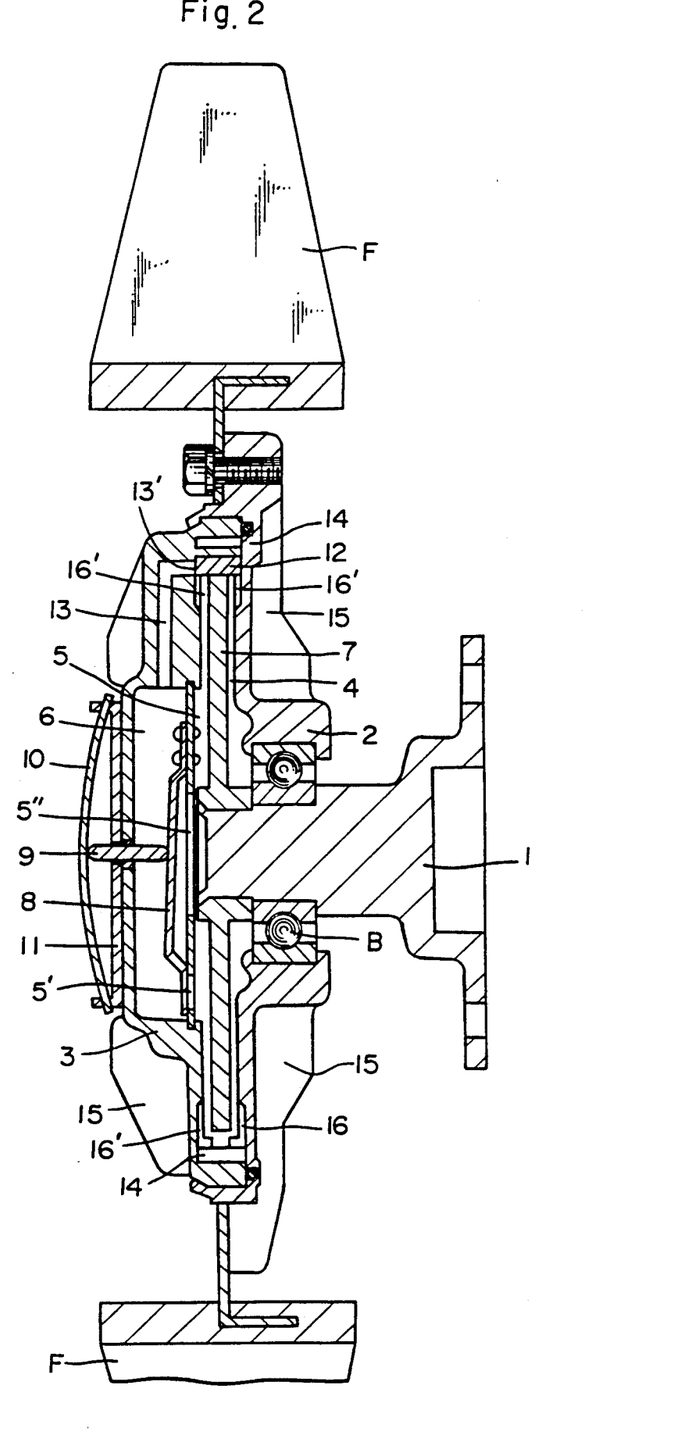
FIG. 2 is a view similar to FIG. 1, but showing another fan fluid coupling according to the invention.
Figure 2A:
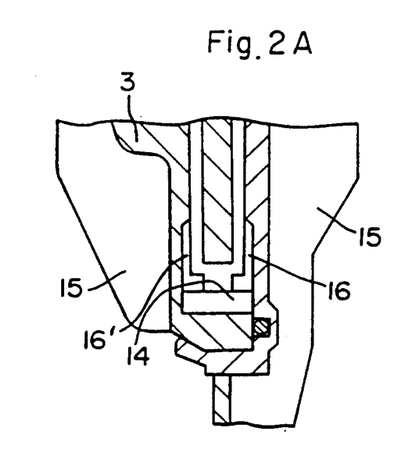
FIG. 2A is an enlarged cross section of main portions of the coupling shown in FIG. 2.
Figure 3:
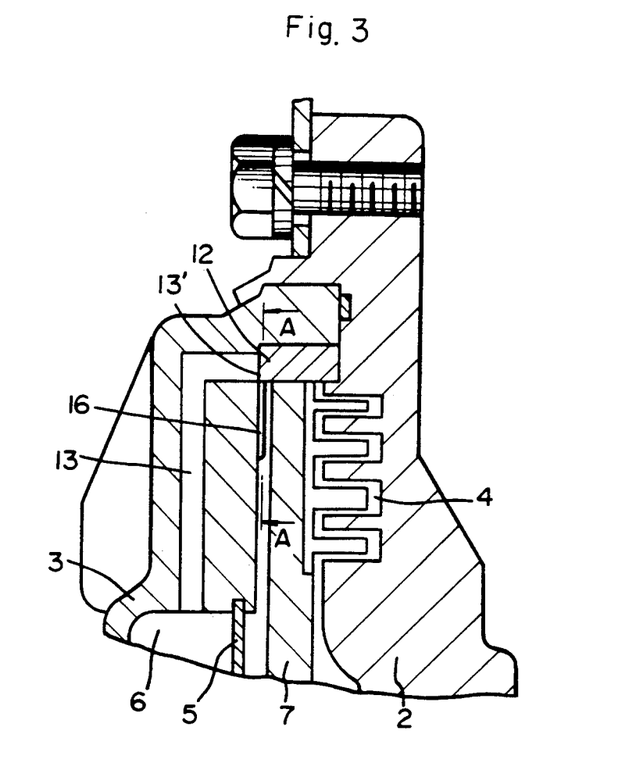
FIG. 3 is a partially cutaway enlarged cross section of main portions of a further fan fluid coupling according to the invention.
Figure 4:
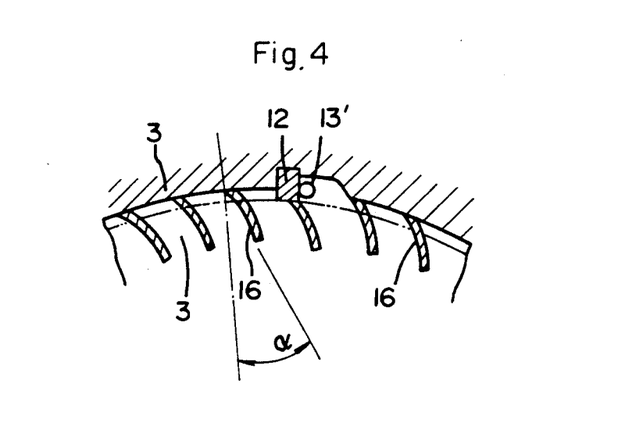
FIG. 4 is a cross-sectional view taken on line A—A of FIG. 3.

An embodiment of the temperature-controlled fan fluid coupling according to the invention is shown in FIGS. 1, 1A, 2, 2A, 3, and 4. A first specific example of this embodiment is shown in FIGS. 1 and 1A. A second specific example of the embodiment is shown in FIGS. 2 and 2A. A third specific example of the embodiment is shown in FIGS. 3 and 4.

In these figures, a rotating shaft 1 has a driving disk 7 rigidly fixed at its front end. An enclosed housing consisting of a cover 3 and a casing 2 is held to the shaft 1 via a bearing B. A cooling fan F is mounted to the outer periphery of the cover 3. The inside of the enclosed housing is partitioned into an oil reservoir chamber 6 and a torque transmission chamber 4 by a partition plate 5 having an outflow control hole 5' for controlling flow of oil from the reservoir chamber 6 into the transmission chamber 4. The driving disk 7 is mounted inside the torque transmission chamber 4. A small gap is maintained between the outer portion of the disk 7 in the torque transmission chamber 4 and the opposite wall surface of the enclosed housing including the partition plate 5, to transmit torque. A valve member 8 opens and closes the outflow control hole 5'. One end of the valve member 8 is riveted to the surface of the partition plate 5 which is on the side of the oil reservoir chamber 6. The other end is located at the position of the hole 5'. A metallic support 11 is rigidly fixed to the front surface of the cover 3. A temperature-sensing element 10 consisting of a bimetallic strip is anchored to the support 11 at its both ends. An interlocking rod 9 bears against the valve member 8 inside the cover 3. As the ambient temperature varies, the temperature-sensing element 10 deforms to move the rod 9 forward or rearward, which in turn shifts the valve member 8.

A dam 12 is formed in a part of the inner wall surface of the enclosed housing that is opposite to the outer wall of the driving disk on which oil collects during rotation. An entrance port 13' is formed near the upstream side of the dam as viewed in the direction of rotation. The torque transmission chamber 4 is in communication with the entrance port 13'. A circulation passage 13 is formed from the torque transmission chamber 4 to the oil reservoir chamber 6 to perform pumping function.

A hole 5" is formed in the center of the partition plate 5 and extends through the plate. In an example having an idle oil reservoir chamber as described later, the hole 5" connects the oil reservoir chamber 6 with the torque transmission chamber 4 only at a stop.

An annular idle oil reservoir chamber 14 (FIG. 2) can be positioned on the side of the enclosed housing, if desired. The chamber 14 is located radially outside the dam 12 and in communication with the torque transmission chamber 4 formed in the inner wall surface of the housing. The capacity of the idle oil reservoir chamber 14 is equal to the amount of oil collected in both torque transmission chamber 4 and the idle oil reservoir chamber 14 at a stop. As particularly shown in FIG. 1A, a number of radially protruding fins 16 are formed near the outer periphery of the driving disk 7 on the enclosed housing at least on the side of the dam 12. The fins are located at least on the upstream side of the dam as viewed in the direction of rotation. Preferably, the fins 16 are inclined at an angle of α (see FIG. 4). More preferably, they are curved to form receiver surfaces in the direction of rotation. As shown in FIGS. 2 and 2A, recessed walls 16' have recesses formed at the same position of the fins 16. The base portion of each fin 16 or the top portion of each recessed wall 16' is formed substantially flush with the inner side surface of the enclosed housing. Where the idle oil reservoir chamber 14 is formed, the recesses extend into this chamber 14. As shown in FIG. 3, a labyrinth mechanism may be formed in the vicinities of the outer periphery of the driving disk 7 and on the opposite wall surface of the enclosed housing to create the torque transmission chamber 4. In this case, oil does not flow smoothly, and the temperature of the oil increases. Further, when the engine is restarted, the rotational speed increases excessively. To prevent these undesired phenomena, it is desired to form the fins 16 or the recessed walls 16' at least on the opposite side of the labyrinth mechanism on the enclosed housing. Cooling fins 15 protrude outwardly from the enclosed housing.

As described thus far, in the first embodiment of the novel temperature-controlled fan fluid coupling, the numerous fins 16 or the recessed walls 16' are formed on the wall surface opposite to the driving disk 7 on the enclosed housing near the outer periphery of the disk 7. Thus, during rotation, the fins serve as guide vanes acting on the oil. Also, the oil is conveyed by centrifugal force. In addition, the fins or the recessed walls perform pumping action to force oil from the torque transmission gap to the dam 12. Especially, the pressure of oil collected in the dam is increased with certainty to prevent hunting. The flow of oil through the gap is smoothened. This stabilizes the control action. Furthermore, the oil passes through the torque transmission gap in a shorter time. As a result, the time for which the mechanism undergoes shear and is heated is decreased. This minimizes the temperature increase of the oil. The oil is quickly and smoothly circulated through the whole internal structure, leading to improved heat dissipation. Hence, the viscosity of the oil is kept from falling. Consequently, the ability to cool the engine does not drop. During prolonged operation, the fan fluid coupling performs more appropriate control function in response to the varying ambient temperature. If necessary, the idle oil reservoir chamber 14 is also formed. The fins 16 or the recessed grooves 16' are formed from the oil reservoir chamber 6 to the idle oil reservoir chamber 14. This enables the oil to circulate rapidly, whereby effectively suppressing the unwanted increase of the rotational speed of the driven fan. Also, the invention can be applied to a system where torque is transmitted by the labyrinth mechanism. In this way, the temperature-controlled fan fluid coupling is quite useful.

A second embodiment of the novel temperature-controlled fan fluid coupling is next described by referring to FIGS. 5A, 5B, 6A, 6B, 6C, and 6D.

Figure 5A:
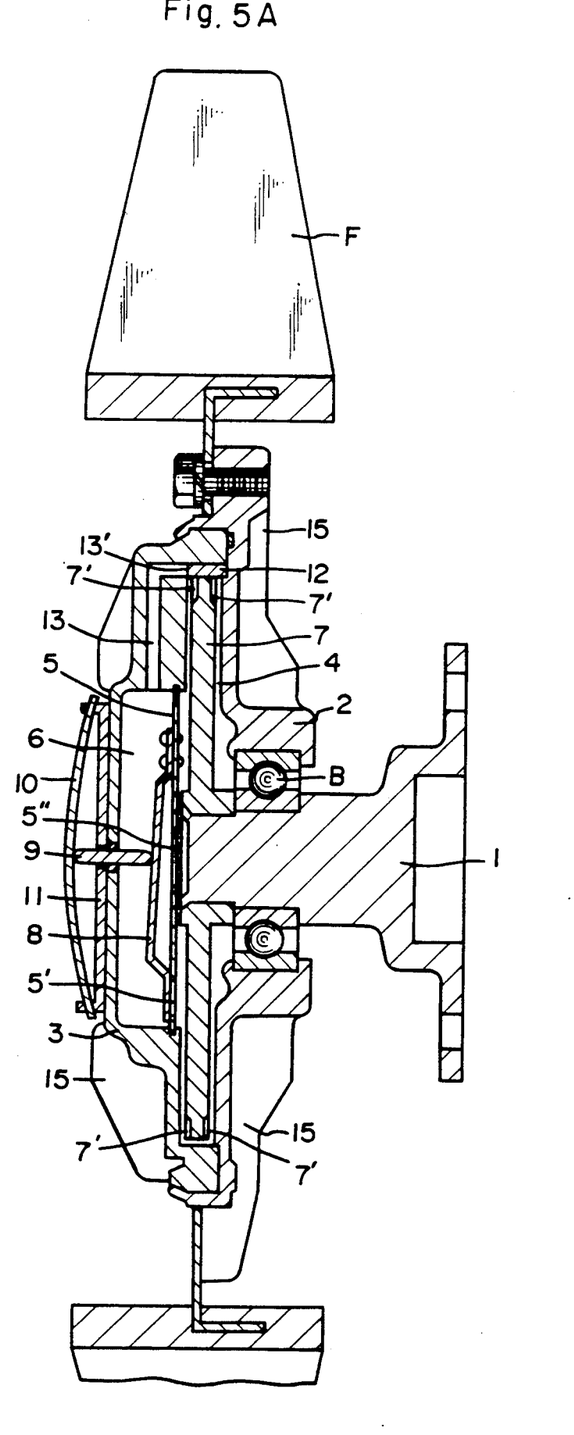
FIG. 5A is a vertical cross section of a still other temperature-controlled fan fluid coupling according to the invention.
Figure 5B:
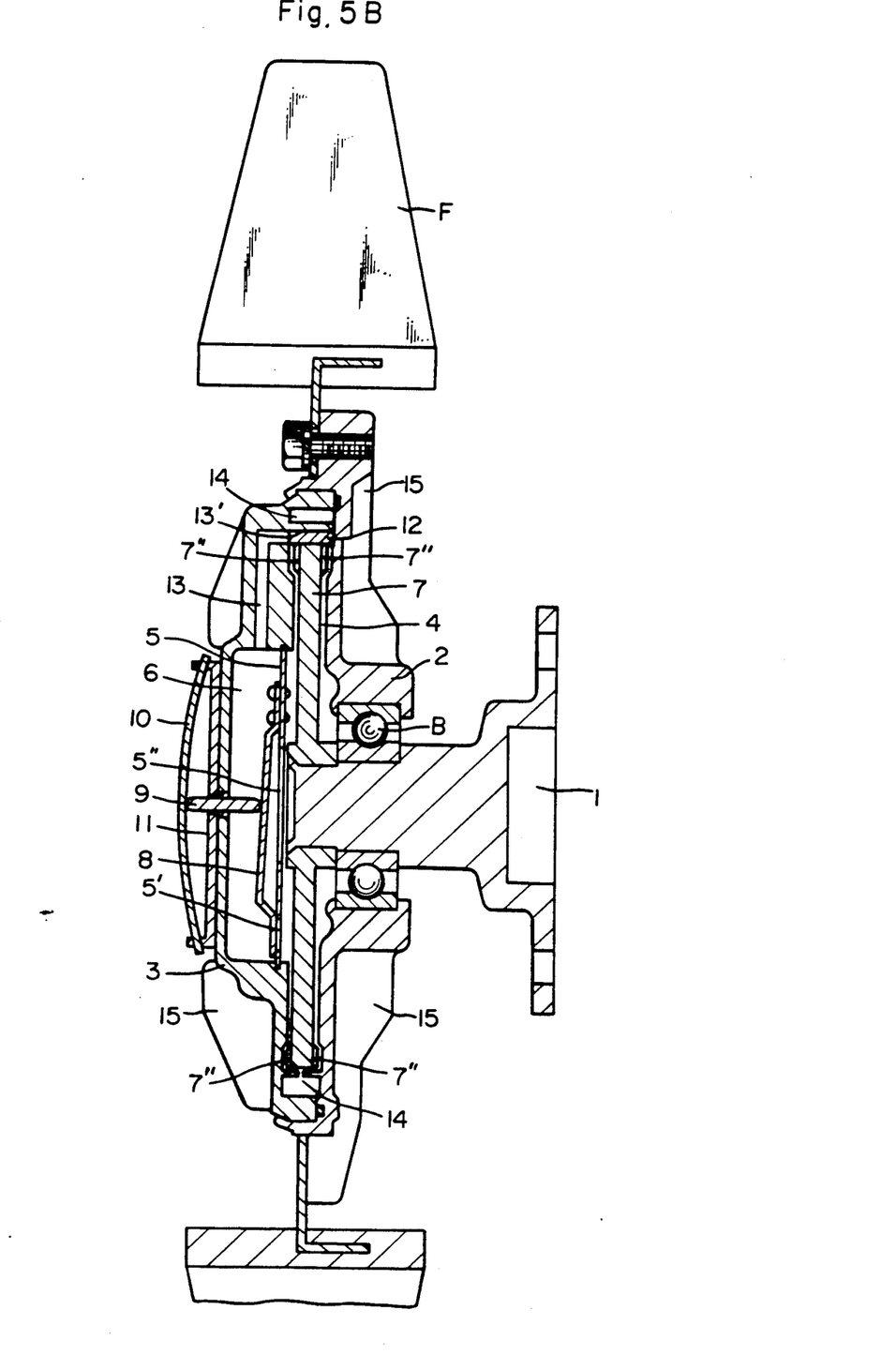
FIG. 5B is a view similar to FIG. 1A, but showing a modification of the coupling shown in FIG. 5A.

In these figures, a rotating shaft 1 has a driving disk 7 rigidly fixed at its front end. An enclosed housing consisting of a cover 3 and a casing 2 is held to the shaft 1 via a bearing B. A cooling fan F is mounted to the outer periphery of the cover 3. The inside of the enclosed housing is partitioned into an oil reservoir chamber 6 and a torque transmission chamber 4 by a partition plate 5 having an outflow control hole 5' for controlling flow of oil from the reservoir chamber 6 into the transmission chamber 4. The driving disk 7 is mounted inside the torque transmission chamber 4. A small gap is maintained between the outer portion of the disk 7 in the torque transmission chamber 4 and the opposite wall surface of the enclosed housing including the partition plate 5, to transmit torque. A valve member 8 opens and closes the outflow control hole 5'. One end of the valve member 8 is riveted to the surface of the partition plate 5 which is on the side of the oil reservoir chamber 6. The other end is located at the position of the hole 5'. A metallic support 11 is rigidly fixed to the front surface of the cover 3. A temperature-sensing element 10 consisting of a bimetallic strip is anchored to the support 11 at its both ends. An interlocking rod 9 bears against the valve member 8 inside the cover 3. As the ambient temperature varies, the temperature-sensing element 10 deforms to move the rod 9 forward or rearward, which in turn shifts the valve member 8.

A dam 12 is formed in a part of the inner wall surface of the enclosed housing that is opposite to the outer wall of the driving disk on which oil collects during rotation. An entrance port 13' is formed near the upstream side of the dam as viewed in the direction of rotation. The torque transmission chamber 4 is in communication with the entrance port 13'. A circulation passage 13 is formed from the torque transmission chamber 4 to the oil reservoir chamber 6 to perform pumping function.

A hole 5" is formed in the center of the partition plate 5 and extends through the plate. In the example shown in FIG. 5B, the hole 5" connects the oil reservoir chamber 6 with the torque transmission chamber 4 only at a stop.

Figure 6A:
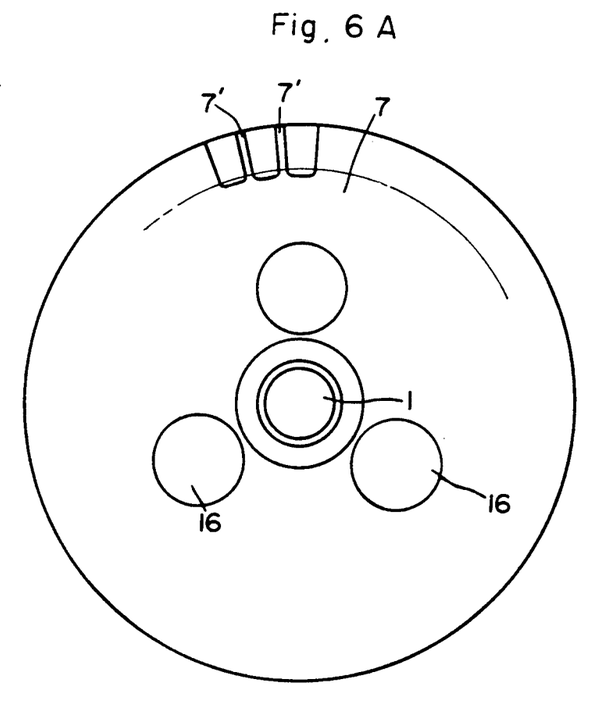
FIG. 6A is a front elevation of the driving disk of the coupling shown in FIG. 5A.
Figure 6B:
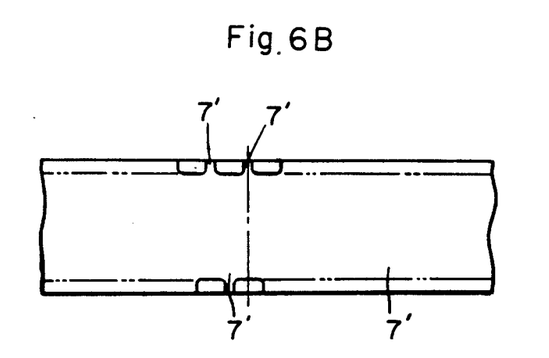
FIG. 6B is a partially cutaway enlarged side elevation of the driving disk shown in FIG. 6A.
Figure 6C:
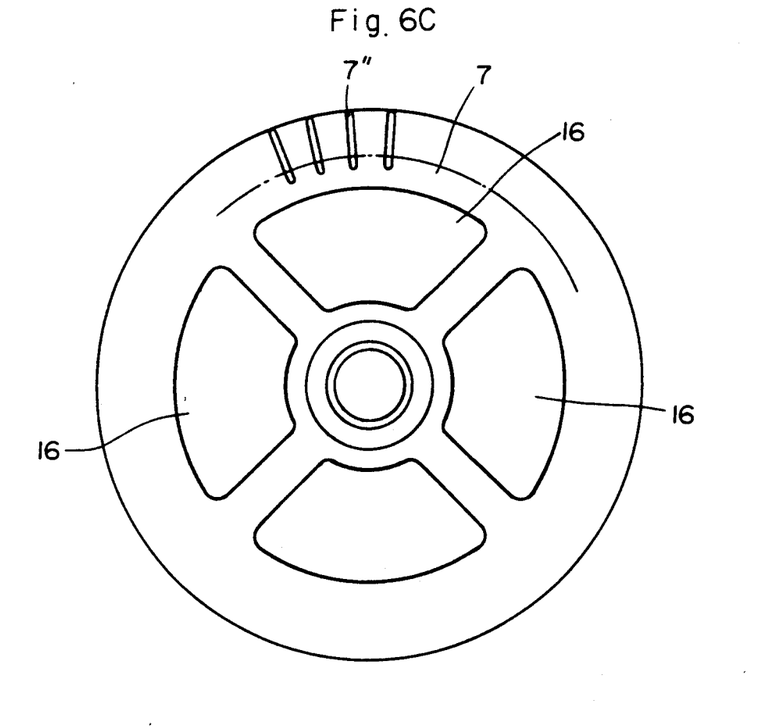
FIG. 6C is a view similar to FIG. 6A, but showing the driving disk of the coupling shown in FIG. 5B.
Figure 6D:
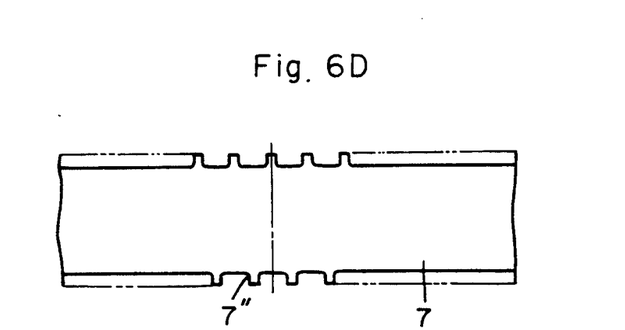
FIG. 6D is a view similar to FIG. 6B, but showing the driving disk of the coupling shown in FIG. 5B.

An annular idle oil reservoir chamber 14 (FIG. 5B) can be positioned on the side of the enclosed housing, if desired. The chamber 14 is located radially outside the dam 12 and in communication with the torque transmission chamber 4 formed in the inner wall surface of the housing. The capacity of the idle oil reservoir chamber 14 is equal to the amount of oil collected in both torque transmission chamber 4 and idle oil reservoir chamber 14 when the engine stops. Cooling fins 15 protrude outwardly from the enclosed housing. A multiplicity of fins 7', 7" protrude radially from the vicinities of the outer periphery of the disk 7. In the illustrated example, the fins 7' and 7" are disposed respectively ahead and behind the outer periphery. Further, the fins are staggered each other. However, the fins are not restricted to this geometry. In FIGS. 5A and 6B, the top of each fin 7' is made flush with the torque-transmitting surface of the driving disk 7. As shown in FIGS. 5B and 6D, the top portion of each fin 7" may be made to protrude from the torque-transmitting surface of the driving disk. Communication holes 16 extend to the rear side.

If desired, in the torque transmission chamber 4, the vicinities of the outer periphery of the driving disk 7 may be caused to radially mesh with the opposite wall surface of the enclosed housing to form a labyrinth mechanism. A number of fins 7' and 7" may be formed close to the outer periphery of the driving disk 7.

Figure 14:
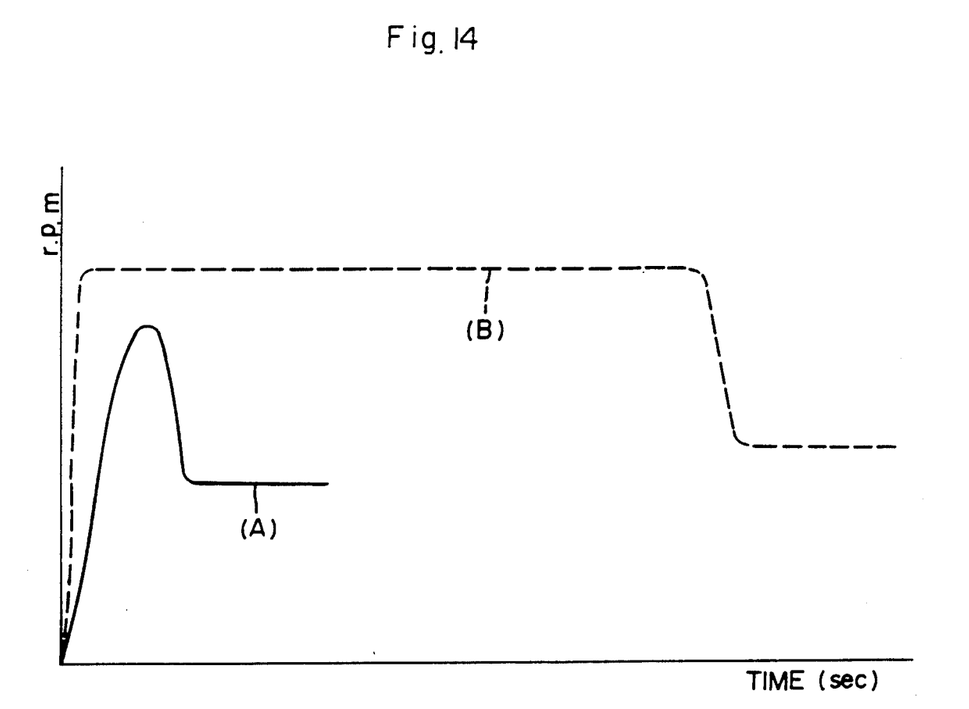
FIG. 14 is a graph showing the operating characteristics of the coupling shown in FIG. 13.

As described thus far, in the second embodiment of the novel temperature-controlled fan fluid coupling, the radially protruding numerous fins 7', 7" are formed near the outer periphery of the driving disk 7. During operation, centrifugal force produced by rotation acts on the oil. Further, the pumping action of the numerous fins forces oil from the torque transmission gap to the dam 12, whereby the dam functions efficiently. The flow of oil through the gap is smoothened. This stabilizes the control action. Furthermore, the oil passes through the torque transmission gap in a shorter time. As a result, the time for which the mechanism undergoes shear and is heated is decreased. This minimizes the temperature increase of the oil. The oil is quickly and smoothly circulated through the whole internal structure, leading to improved heat dissipation. Hence, the viscosity of the oil is kept from falling. Consequently, the ability to cool the engine does not drop. In this way, hunting is prevented. During prolonged operation, the fan fluid coupling performs more appropriate control function in response to the varying ambient temperature. If necessary, the idle oil reservoir chamber 14 is also formed. Since the oil is allowed to circulate rapidly, the unwanted increase of the rotational speed of the driven fan as indicated by characteristic curve A in FIG. 14 is more effectively suppressed. In this way, the temperature-controlled fan fluid coupling is quite useful.

A third embodiment of the novel temperature-controlled fan fluid coupling according to the invention is shown in FIGS. 7A, 7B, 8, 9, 10, 11, and 12.

Figure 7A:
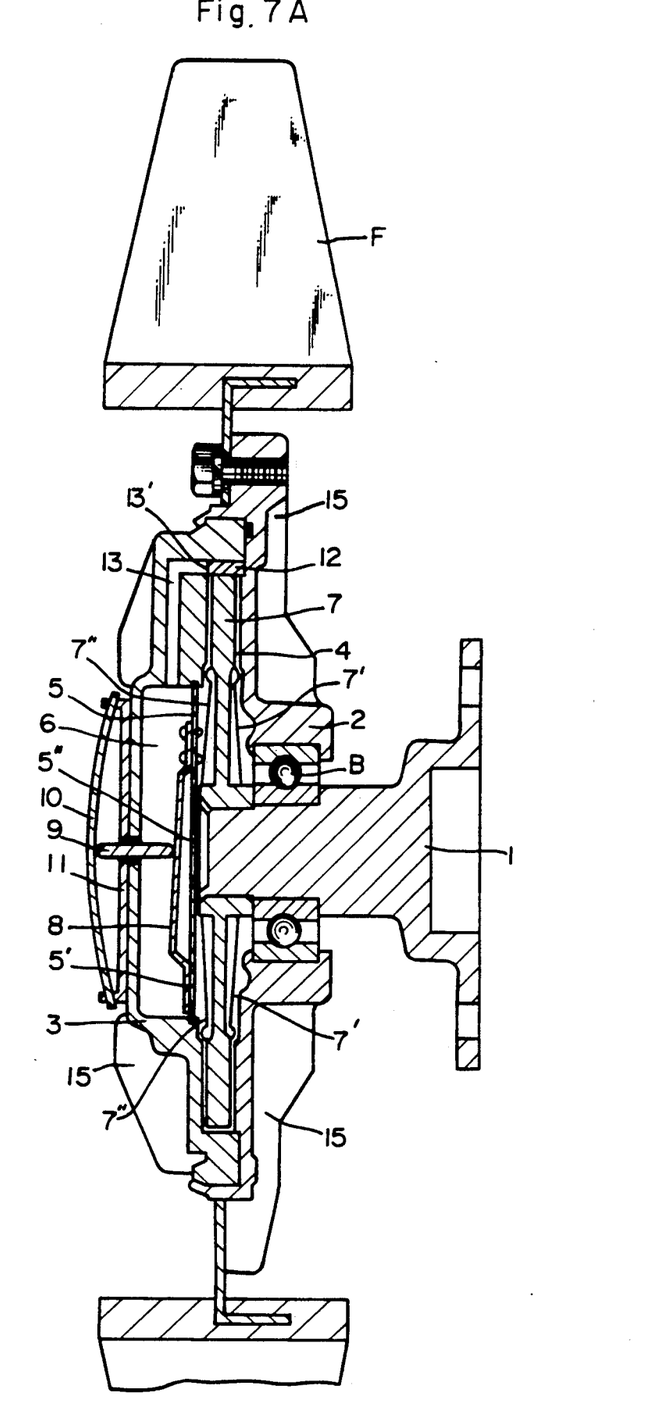
FIG. 7A is a vertical cross section of a yet further temperature-controlled fan fluid coupling according to the invention.
Figure 7B:
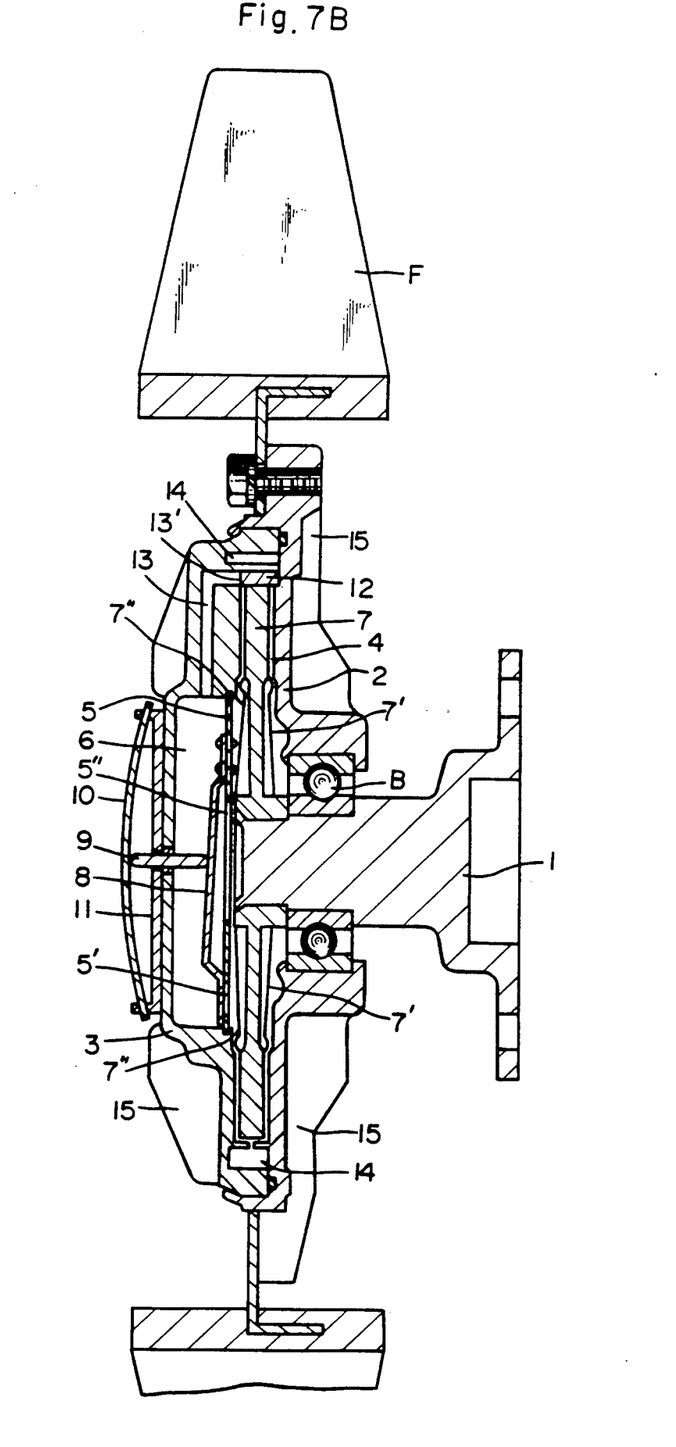
FIG. 7B is a view similar to FIG. 7A, but showing a modification of the coupling shown in FIG. 7A.
Figure 8:
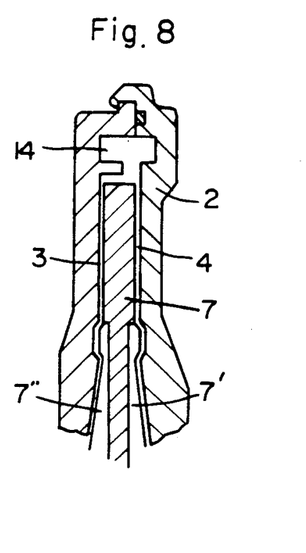
FIG. 8 is a partially cutaway enlarged cross section of main portions of a further modification of the coupling shown in FIG. 7A.
Figure 9:
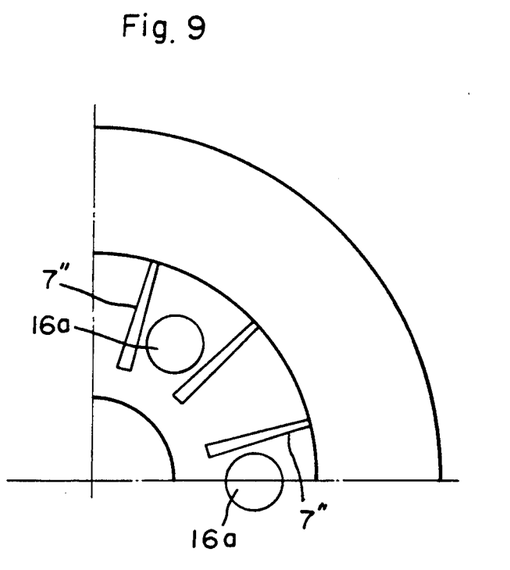
FIG. 9 is a fragmentary plan view of the driving disk shown in FIG. 8.
Figure 10:
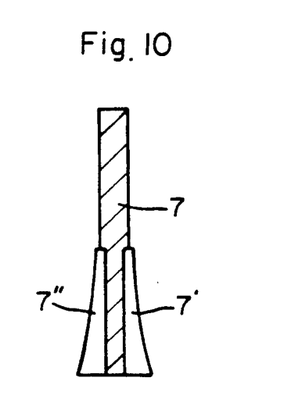
FIG. 10 is a fragmentary vertical cross section of another driving disk.
Figure 11:
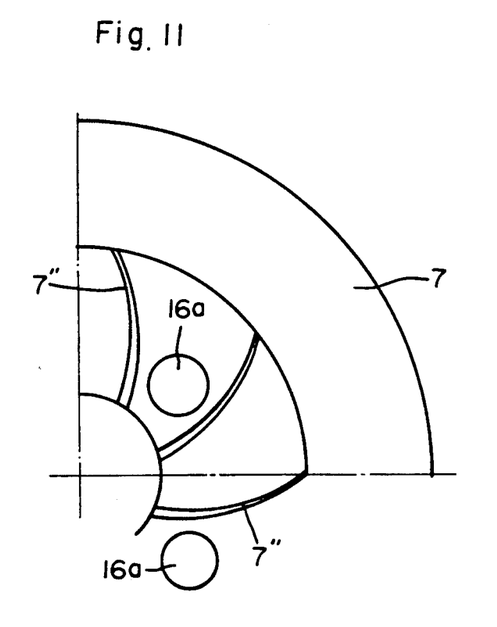
FIG. 11 is a fragmentary plan view of the disk shown in FIG. 10.

In these figures, a rotating shaft 1 has a driving disk 7 rigidly fixed at its front end. An enclosed housing consisting of a cover 3 and a casing 2 is held to the shaft 1 via a bearing B. A cooling fan F is mounted to the outer periphery of the cover 3. The inside of the enclosed housing is partitioned into an oil reservoir chamber 6 and a torque transmission chamber 4 by a partition plate 5 having an outflow control hole 5' for controlling flow of oil from the reservoir chamber 6 into the transmission chamber 4. The driving disk 7 is mounted inside the torque transmission chamber 4. A small gap is maintained between the outer portion of the disk 7 in the torque transmission chamber 4 and the opposite wall surface of the enclosed housing including the partition plate 5, to transmit torque. A valve member 8 opens and closes the outflow control hole 5'. One end of the valve member 8 is riveted to the surface of the partition plate 5 which is on the side of the oil reservoir chamber 6. The other end is located at the position of the hole 5'. A metallic support 11 is rigidly fixed to the front surface of the cover 3. A temperature-sensing element 10 consisting of a bimetallic strip is anchored to the support 11 at its both ends. An interlocking rod 9 bears against the valve member 8 inside the cover 3. As the ambient temperature varies, the temperature-sensing element 10 deforms to move the rod 9 forward or rearward, which in turn shifts the valve member 8.

A dam 12 is formed in a part of the inner wall surface of the enclosed housing that is opposite to the outer wall of the driving disk 7 on which oil collects during rotation. An entrance port 13' is formed near the upstream side of the dam as viewed in the direction of rotation. The torque transmission chamber is in communication with the entrance port 13'. A circulation passage 13 is formed from the torque transmission chamber 4 to the oil reservoir chamber 6 to perform pumping function.

A hole 5'' is formed in the center of the partition plate 5 and extends through the plate. In the example shown in FIG. 7B, the hole 5'' connects the oil reservoir chamber 6 with the torque transmission chamber 4 only at a stop.

An annular idle oil reservoir chamber 14 (FIG. 7B) can be positioned on the side of the closed housing, if desired. The chamber 14 is located radially outside the dam 12 and in communication with the torque transmission chamber 4 formed in the inner wall surface of the housing. The capacity of the idle oil reservoir chamber 14 is equal to the amount of oil collected in both torque transmission chamber 4 and idle oil reservoir chamber 14 when the engine stops. Cooling fins 15 protrude outwardly from the enclosed housing. Radially arranged fins or convex walls 7' or 7'' are formed on at least one of both surfaces of the driving disk 7 and located radially inside of the torque transmission gap to form an impeller structure. If necessary, a plurality of communication holes 16a are formed between the successive convex walls.

Figure 12:
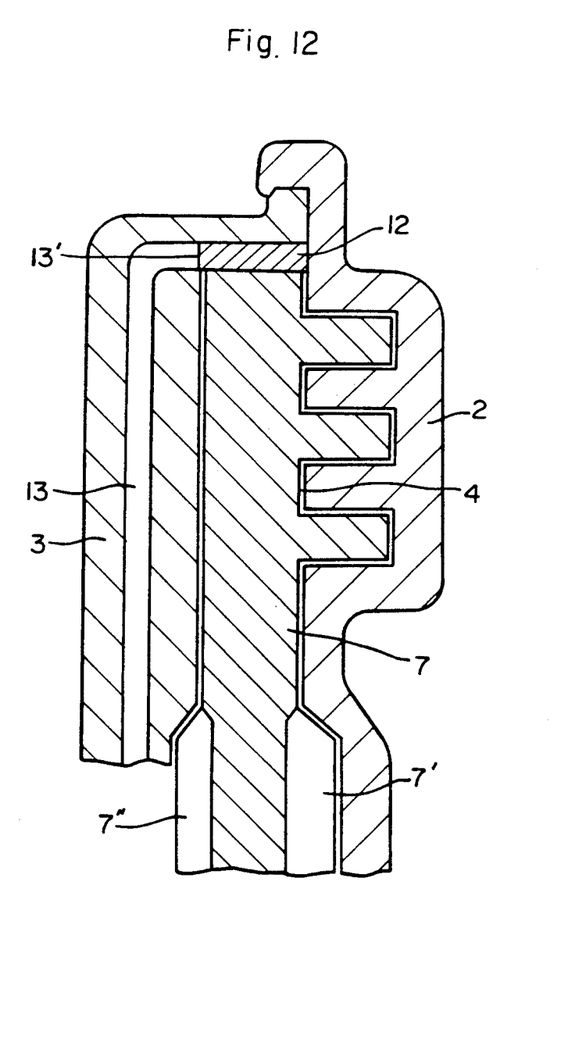
FIG. 12 is a fragmentary enlarged cross section of the labyrinth mechanism in the enclosed housing of the coupling shown in FIG. 2.

In FIG. 12, the torque transmission chamber 4 is equipped with a labyrinth mechanism. In particular, the vicinities of the outer wall surface of the driving disk 7 are in radially mesh with the opposite wall surface of the enclosed housing. In this case, oil does not flow smoothly through the labyrinth mechanism. As a result, oil temperature tends to increase. Also, when the engine is restarted, the rotational speed of the fan tends to increase excessively. To prevent these undesired phenomena, the driving disk may have convex walls 7' or 7', 7'' on the side of the labyrinth mechanism.

As described thus far, the third embodiment of the novel temperature-controlled fan fluid coupling has the fins or convex walls 7' or 7', 7'' radially protruding from the driving disk 7. Thus, the disk has the impeller structure. During operation, centrifugal force produced by rotation acts on the oil. Further, the pumping action performed by the convex walls 7' or 7', 7'' forces oil out of and into the torque transmission gap. The flow of oil through the gap is smoothened. This stabilizes the control action. Furthermore, the oil passes through the torque transmission gap in a shorter time. As a result, the time for which the mechanism undergoes shear and is heated is decreased. This minimizes the temperature increase of the oil. Circulation of oil through the whole internal structure, including flow toward the dam 12, is made fast, leading to improved heat dissipation. Hence, the viscosity of the oil is kept from falling. Consequently, the ability to cool the engine does not drop. During prolonged operation, the fan fluid coupling performs more appropriate control function in response to the varying ambient temperature. At the same time, the fan fluid coupling can be fabricated in small size. Where the idle oil reservoir chamber 14 and the labyrinth mechanism that especially augments the transmitted torque are mounted, the oil is circulated through the circulation passage more quickly. Consequently, the aforementioned undesired increase of the rotational speed after restart of the engine can be prevented or suppressed more effectively.

What is claimed is:

1. A temperature-controlled fan fluid coupling comprising:

an enclosed housing consisting of a cover and a casing;

a rotating shaft having a driving disk fixed at the front end of the shaft one surface of the driving disk being in radial mesh with an opposite wall surface of the enclosed housing to form a labyrinth mechanism;

a bearing via which the housing is held to the rotating shaft;

a partition plate that is provided with an oil outflow control hole and divides the inside of the housing into an oil reservoir chamber and a torque transmission chamber in which the driving disk is mounted;

a dam formed in a part of the inner wall surface of the housing and opposite to the outer wall of the driving disk on which oil is collected during rotation;

a circulation passage connected with the dam and extending from the torque transmission chamber to the oil reservoir chamber;

a temperature-sensing element which is installed on the front surface of the cover and deforms as temperature varies; and a valve member which interlocks with the temperature-sensing element and which, when the ambient temperature exceeds a predetermined temperature, opens the outflow control hole in the partition plate and which, when the ambient temperature is below the predetermined temperature, closes the outflow hole, the torque transmitted from the rotating shaft to the driven enclosed housing being controlled by increasing and decreasing the effective area with which oil makes contact with the driving disk at a torque transmission gap formed between opposite outer walls of the casing and the cover; and an oil supply means formed on one of the surfaces of the housing and the driving disk opposite of the labyrinth and at the entrance side of the circulation passage to force oil to the dam.

2. The temperature-controlled fan fluid coupling of claim 1, wherein the oil supply means comprises radially protruding fins.

3. The temperature-controlled fan fluid coupling of claim 1, wherein the oil supply means comprises recessed walls.

4. The temperature-controlled fan fluid coupling of claim 1, wherein the oil supply means comprises radially protruding fins and recessed walls.

5. A temperature-controlled fan fluid coupling comprising:

an enclosed housing consisting of a cover and a casing;

a rotating shaft having a driving disk rigidly fixed at the front end of the shaft;

a bearing via which the housing is held to the rotating shaft;

a partition plate that is provided with an outflow control hole and divides the inside of the housing into an oil reservoir chamber and a torque transmission chamber in which the driving disk is mounted;

a dam formed in a part of the inner wall surface of the housing and opposite to the outer wall of the driving disk on which oil is collected during rotation;

an annular idle oil reservoir chamber provided in the enclosed housing and located radially outside the dam and in communication with the torque transmission chamber;

circulation passage connected with the dam and extending from the torque transmission chamber to the oil reservoir chamber;

a temperature-sensing element which is installed on the front surface of the cover and deforms as temperature varies; and a valve member which interlocks with the temperature sensing element and which, when the ambient temperature exceeds a predetermined temperature, closes the outflow control hole, the torque transmitted from the rotating shaft to the driven closed housing being controlled by increasing and decreasing the effective area with which oil makes contact with the driving disk at a torque transmission gap formed between opposite outer walls of the casing and the cover; and a multiplicity of radially protruding fins (16) or recessed walls (16') on the wall surface of the driving disk (7) of the enclosed housing near the outer periphery of the disk (7) and at least on the side of the dam (12).

6. The temperature-controlled fan fluid coupling of claim 5, wherein the fins (16) or the recessed walls (16') are disposed at least on the upstream side of the dam (12) as viewed in the direction of rotation.

7. The temperature-controlled fan fluid coupling of claim 5, wherein a portion of each fin (16) spaced from the driving disk is made substantially flush with the inner side surface of the enclosed housing.

8. The temperature-controlled fan fluid coupling of claim 5, wherein the fins (16) or the recessed walls (16') are inclined at an angle from a radial direction and protrude axially.

9. The temperature-controlled fan fluid coupling of claim 5 wherein the fins (16) or the recessed walls (16') are formed on a side of the driving disk (7) and opposite to a labyrinth mechanism of the driving disk (7).

10. The temperature-controlled fan fluid coupling of claim 5, wherein said fins (16) or the recessed walls (16') extend into the idle oil reservoir chamber (14).

11. A temperature-controlled fan fluid coupling comprising:

an enclosed housing consisting of a cover and a casing;

a rotating shaft having a driving disk rigidly fixed at the front end of the shaft;

a bearing via which the housing is held to the rotating shaft;

a partition plate that is provided with an oil outflow control hole and divides the inside of the housing into an oil reservoir chamber and a torque transmission chamber in which the driving disk is mounted;

a dam formed in a part of the inner wall surface of the housing and opposite to the outer wall of the driving disk on which oil is collected during rotation;

an annular idle oil reservoir formed on an inner wall surface of the housing radially outside the dam, the idle oil reservoir chamber being in communication with the torque transmission chamber;

a circulation passage connected with the dam and extending from the torque transmission chamber to the oil reservoir chamber;

a temperature-sensing element which is installed on the front surface of the cover and deforms as temperature varies; and a valve member which interlocks with the temperature-sending element and which, when the ambient temperature exceeds a predetermined temperature, opens the outflow control hole in the partition plate and which, when the ambient temperature is below the predetermined temperature, closes the outflow control hole, the torque transmitted from the rotating shaft to the driven enclosed housing being controlled by increasing and decreasing the effective area with which oil makes contacts with the driving disk at a torque transmission gap formed between opposite outer walls of the casing and the cover; and a multiplicity of radially protruding fins (7') formed near the outer periphery of the driving disk (7).

12. The temperature-controlled fan fluid coupling of claim 11 wherein the outer periphery of the driving disk is of reduced axial thickness, each fin (7') extends axially from the reduced thickness portion of the driving disk to be flush with the torque transmission surface of the driving disk (7) radially inwardly from the reduced thickness portion of the driving disk.

13. The temperature-controlled fan fluid coupling of claim 11, wherein each fin (7") protrudes from the torque transmission surface of the driving disk (7).

14. A temperature-controlled fan fluid coupling comprising:

an enclosed housing consisting of a cover and a casing;

a rotating shaft having a driving disk fixed at the front end of the shaft;

a bearing via which the housing is held to the rotating shaft;

a partition plate that is provided with an oil outflow control hole and divides the inside of the housing into an oil reservoir chamber and a torque transmission chamber in which the driving disk is mounted;

a dam formed in a part of the inner wall surface of the housing and opposite to the outer wall of the driving disk on which oil is collected during rotation;

an annular idle oil reservoir chamber formed in the inner wall surface of the housing radially outside the dam, the annular idle oil reservoir chamber being in communication with the torque transmission chamber;

a circulation passage connected with the dam and extending from the torque transmission chamber to the oil reservoir chamber;

a temperature-sensing element which is installed on the front surface of the cover and deforms as temperature varies;

a valve member which interlocks with the temperature-sensing element and which, when the ambient temperature exceeds a predetermined temperature, opens the outflow control hole in the partition plate and which, when the ambient temperature is below the predetermined temperature, closes the outflow control hole, the torque transmitted from the rotating shaft to the driven enclosed housing being controlled by increasing and decreasing the effective area with which oil makes contact with the driving disk at a torque transmission gap formed between opposite outer walls of the casing and the cover; and radially arranged convex walls (7 or 7', 7") formed at least on one of both side surfaces of the driving disk (7) radially inside the torque transmission gap.

15. The temperature-controlled fan fluid coupling of claim 14, wherein the vicinities of the outer wall surface of the driving disk (7) are in radial mesh with opposite wall surface of the enclosed housing to form a labyrinth mechanism.

* * * * *